(12) United States Patent
Meisler (10) Patent No.: US 12,351,135 B2
(45) Date of Patent: Jul. 8, 2025

(54) VEHICLE HEADREST SAFE

(71) Applicant: Irving Meisler, Birmingham, AL (US)

(72) Inventor: Irving Meisler, Birmingham, AL (US)

(73) Assignee: The Headrest Safe IP Company, LLC, Birmingham, AL (US)

( * ) Notice: Subject to any disclaimer, the term of this patent is extended or adjusted under 35 U.S.C. 154(b) by 158 days.

(21) Appl. No.: 18/071,088

(22) Filed: Nov. 29, 2022

(65) Prior Publication Data

US 2023/0086255 A1 Mar. 23, 2023

Related U.S. Application Data

(63) Continuation-in-part of application No. 17/224,570, filed on Apr. 7, 2021, now Pat. No. 12,122,326.

(60) Provisional application No. 63/157,173, filed on Mar. 5, 2021.

(51) Int. Cl.
*B60R 7/08* (2006.01)
*B60R 7/04* (2006.01)
*B60R 7/14* (2006.01)

(52) U.S. Cl.
CPC .............. *B60R 7/087* (2013.01); *B60R 7/043* (2013.01); *B60R 7/14* (2013.01)

(58) Field of Classification Search
CPC ............ B60R 7/087; B60R 7/043; B60R 7/14
See application file for complete search history.

(56) References Cited

U.S. PATENT DOCUMENTS

| | | | | | |
|---|---|---|---|---|---|
| 2,132,323 | A | * | 10/1938 | Sander | B60R 7/14 224/281 |
| 3,449,011 | A | * | 6/1969 | Edwards | B60N 3/08 297/188.21 |
| 3,464,606 | A | * | 9/1969 | Nordeen | A47B 81/005 224/281 |
| 4,926,762 | A | * | 5/1990 | Paul | B60R 7/087 109/51 |
| 7,434,427 | B1 | * | 10/2008 | Miresmaili | F41C 33/06 42/70.11 |
| 10,850,672 | B1 | * | 12/2020 | Meisler | B60R 7/14 |
| 11,566,866 | B1 | * | 1/2023 | Baker | F41C 33/0209 |
| 2018/0290573 | A1 | * | 10/2018 | Faruque | B60N 2/879 |

* cited by examiner

*Primary Examiner* — Derek J Battisti
(74) *Attorney, Agent, or Firm* — Baker Donelson Bearman Caldwell & Berkowitz, PC (57) ABSTRACT

A vehicle headrest safe is disclosed which is used in conjunction with the seat of the automobile. The headrest safe includes an exterior housing with a front surface, a rear surface, a left side surface, a right side surface, a top surface, and a bottom surface. The exterior housing includes a pivoting door. The headrest safe also includes a hollow metal container positioned within the interior of the exterior housing. The container has a main portion and a container door. The container also has a reciprocating gun tray coupled directly to the container door. The exterior housing door has a biometric lock.

19 Claims, 7 Drawing Sheets

VEHICLE HEADREST SAFE

CROSS REFERENCE TO RELATED APPLICATIONS

Applicant claims the benefit of U.S. patent application Ser. No. 17/224,570 filed Apr. 7, 2021 and entitled "Automobile Headrest Safe" which claims the benefit of U.S. Provisional Patent Application Ser. No. 63/157,173 filed Mar. 5, 2021 and entitled "Automobile Headrest Safe".

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

TECHNICAL FIELD

The present disclosure relates to safes, and more particularly, the disclosure relates to a gun safe which is found in an automobile or other type of vehicle.

BACKGROUND OF THE INVENTION

Safes have been used for decades to allow for the storage of items, such as guns while preventing the unauthorized access to the guns therein. Many safes use a metal enclosure having a lock. The lock may be in the form of a combination lock, key lock, or a more modern biometric lock which is access through a person's fingerprint or the like.

Guns are oftentimes transported or stowed inside cars for the protection of the occupant. While guns may be stowed within a console or glove box of a car, these are not considered to be a gun safe as they do not have the necessary lock and tamper resistance capabilities. A car storage compartment has also been designed to be included into the headrest of a seat, as shown in Korean Patent Application KR19980001253. However, here again, the headrest storage compartment does not include a lock or the tamper resistant capabilities to prevent access to a gun therein. Furthermore, the access to the interior area of the storage compartment is difficult for a driver.

Some gun safes have been adapted to be used within automobiles or cars. These gun safes may be in the form of a metal box which is simply secured to the car, such as that shown in U.S. Pat. No. 5,996,865. Gun safes have also been designed to be incorporated into the glove box or console of a car, as shown in U.S. Patent Application No. 20190102963. A gun safe has also been designed to be incorporated into the structure of a car's sun visor, as shown in U.S. Pat. No. 10,232,790. While these gun safes provide a secure structure for the safe storage of a gun, they require the use of multiple hands to operate and do not provide the most direct access to the gun within the safe. Also, as they are stored in a stationary position, the person must reach into the gun safe in order to extract the gun therein.

Accordingly, it is seen that a need remains for a gun safe which is incorporated into an automobile or vehicle for the safe storage yet easy access to a gun therein. It is to the provision of such therefore that the present invention is primarily directed.

BRIEF SUMMARY OF THE INVENTION

A safe adapted to be mounted to a vehicle seat comprises an exterior housing contoured to resemble a car headrest. The exterior housing has a front surface oriented relative to the front surface of the vehicle seat, a rear surface oppositely disposed from the front surface, two oppositely disposed side surfaces extending between the front surface and the rear surface, a top surface extending between the front surface and the rear surface, and a bottom surface extending between the front surface and the rear surface. One the side surfaces has a pivotal door portion for reciprocal movement between a closed position and an open position. The safe also includes a container mounted within the exterior housing. The container has a main portion and a container door pivotally mounted to the main portion for reciprocal movement between a locked position and an unlocked position. A lock is coupled to the container door to prevent the opening of the container door when in a locked position and to allow the opening of the container door when in an unlocked position. The safe also has a movable fun tray coupled to the container door for reciprocal movement between a retracted position confined within the container and an extended position at least partially extending outward from the container. The container door being movable along with the reciprocal movement of the movable gun tray.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

With reference next to the drawings, there is a shown an automobile headrest safe 10 in a preferred form of the present invention, although it may be coupled to any type of vehicle's seat. The headrest safe 10 is used in conjunction with the seat S of the automobile, and preferably is aesthetically designed to be substituted for the standard seat headrest of the automobile to provide a uniform appearance to the automobile's interior. The headrest safe 10 is coupled to the standard seat through a link or member 11 which is configured similarly to the standard mounting member of the standard headrest.

The headrest safe 10 includes an exterior housing 12 which is made of a soft material and is shaped to conform to or resemble the standard, stock headrest of that particular automobile. The exterior housing 12 includes a front surface 16 which faces forward with respect to the automobile, a rear surface 18 facing rearwardly, a left side surface 20, a right side surface 22, a top surface 24 and a bottom surface 26. The left and right side surfaces 20 and 22 face laterally with respect to the automobile so that one side surface faces either the driver when mounted to the passenger seat or faces the passenger when mounted to the driver's seat. The exterior housing 12 has a pivotal exterior side door, door portion, or cover 28 and may include a soft cushion or filler material 30 underlying an outer covering 29.

Figure 1:
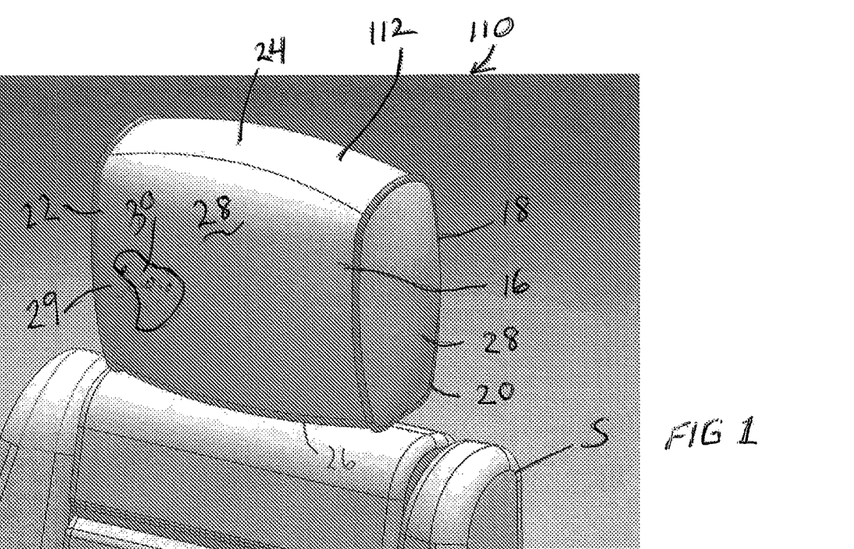
FIG. 1 is a perspective view of a vehicle headrest safe embodying principles of the invention in a preferred form.
Figure 2:
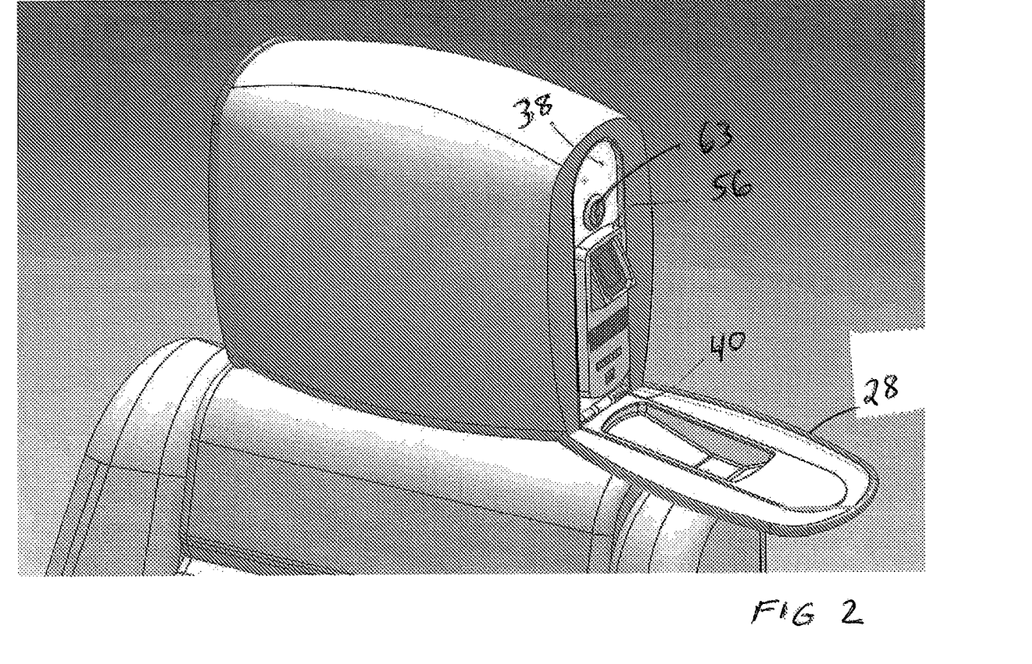
FIGS. 2-4 are a sequence of perspective views showing the opening of the vehicle headrest safe of FIG. 1, shown with a gun positioned therein.

A hollow metal interior enclosure, housing, box, or container 34 is positioned within the interior of the exterior housing 12. The container 34 includes a tubular main or body portion 36 having an open end or opening 37 and a pivotal, reciprocating side door 38 having a spring 40 which biases the side door 38 from a closed position closing the body portion opening 37, shown in FIG. 2, to an open position allowing access to the interior of the container 34 through opening 37, shown in FIG. 3. The main portion 36 has a bottom wall 44, top wall 46, two side walls 48, and an end wall 50 oppositely disposed from the container side door 38.

The pivotal side door 38 includes a lock or locking device 56 which prevents the unauthorized opening of the side door 38. The lock 56 is preferably a biometric lock having a fingerprint reader 58. The lock 56 includes a latch 60 which engages a catch 62 mounted to the container 34. The lock 56 maintains the side door 38 in its closed or locked position. The lock 56 may also include an optional key cylinder lock 63 which may override the biometric lock for select access.

Figure 3:
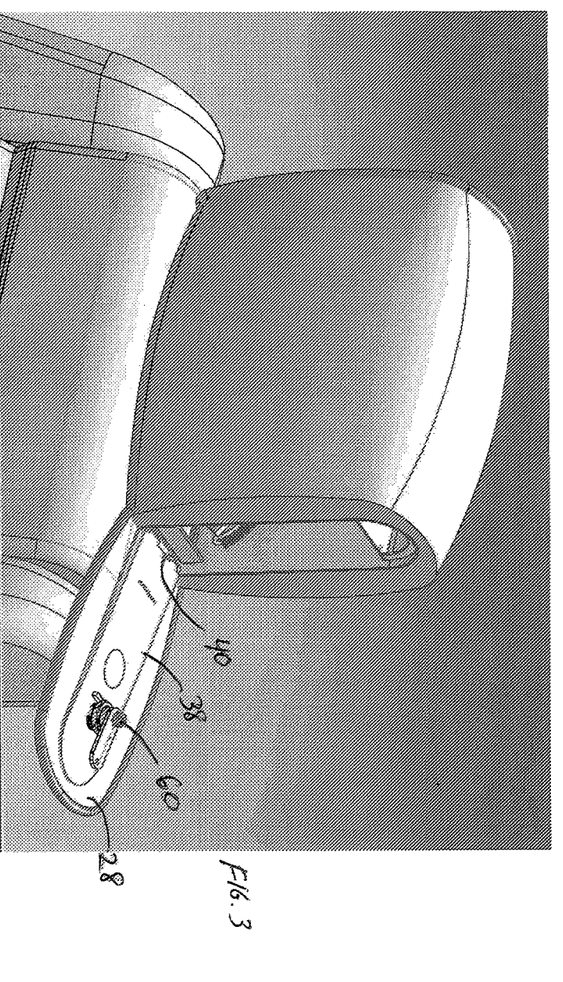
Figure 4:
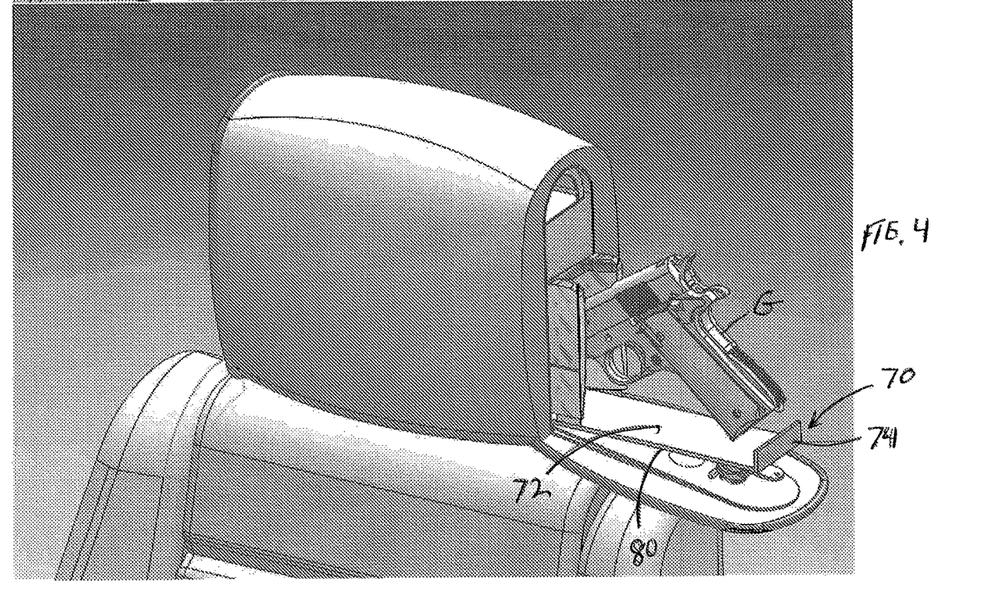
Figure 5:
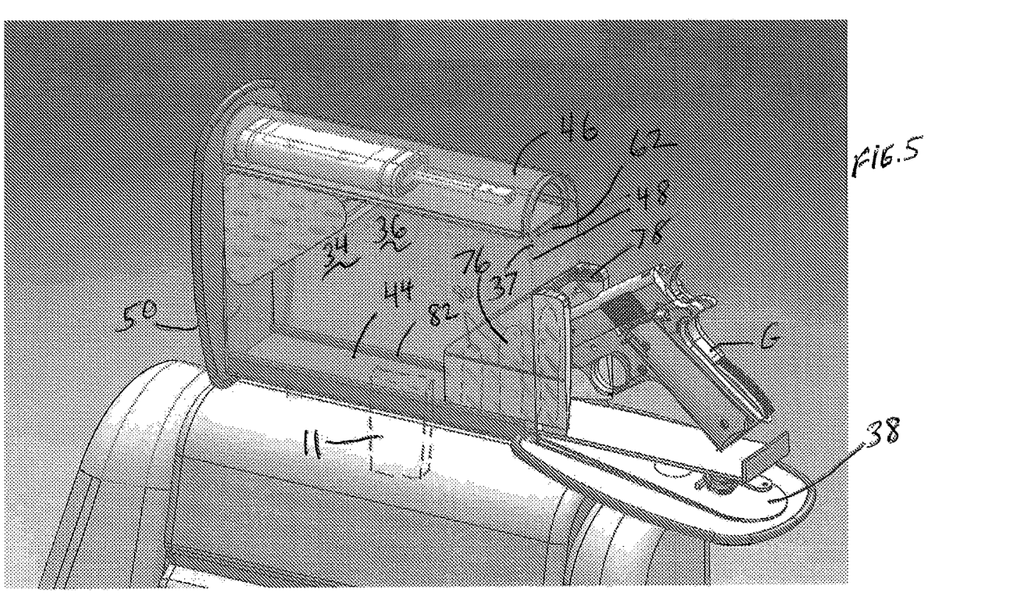
FIG. 5 is a perspective view of the vehicle headrest safe of FIG. 1, shown with select portions removed or shown in phantom lines and shown with a gun positioned therein.
Figure 6:
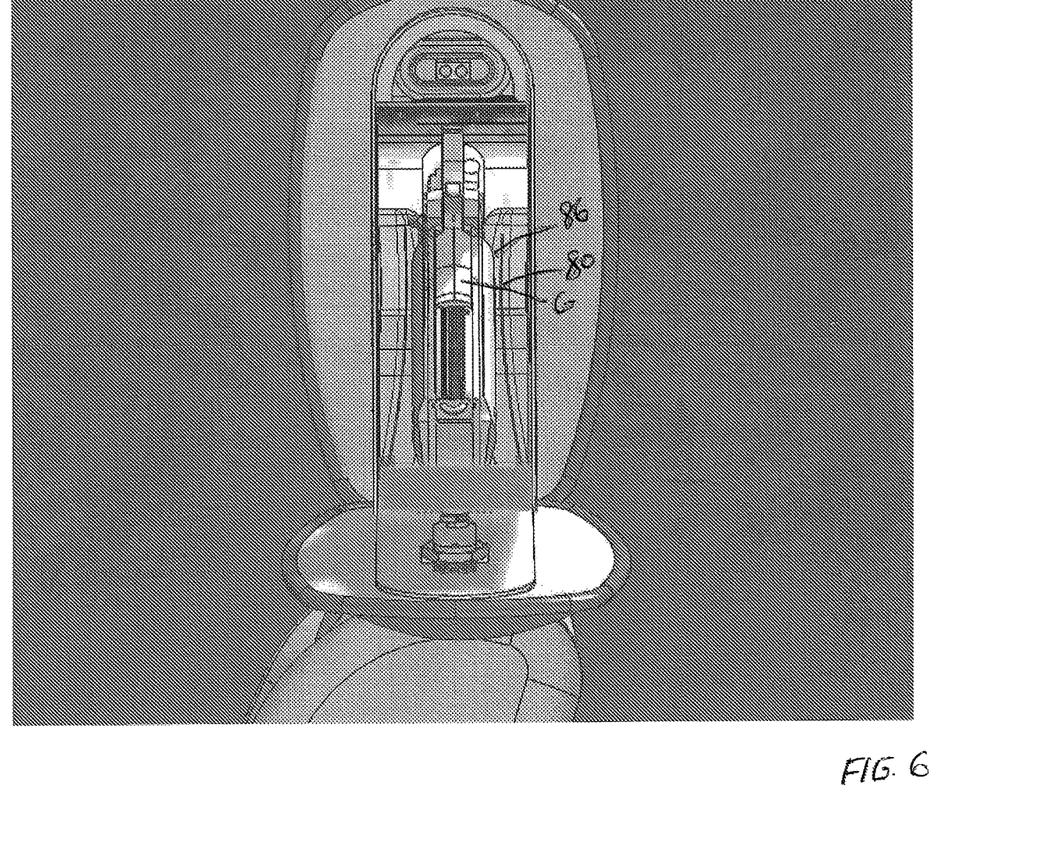
FIG. 6 is an end view of the vehicle headrest safe of FIG. 1, shown with a gun positioned therein.

A reciprocating gun slide, holder, or tray 70 is mounted within the interior of the container 34 for reciprocal movement between a retracted or stowed position, shown in FIG. 3, and an extended position, shown in FIG. 4. The tray 70 includes a floor 72, an end lip or finger flange 74, and two sidewalls 76 forming a gun channel 78 therebetween. The tray 70 is sized and shaped to house a pistol or gun G upon the tray 70 and within the gun channel 78. The side edges 80 of the tray of configured to be received within grooves 82 extending into the container 34 to form a tongue and groove type arrangement to allow reciprocal sliding of the tray 70. A resilient cushion or compressible layer 86 may be mounted to the inboard or interior surface of the side walls 76 to provide a soft yet snug cradling or holding of the gun G within the gun channel 78, to prevent unwanted movement of the gun G when stowed, but maintain the upright positioning of the gun G for easy extraction from the tray 70. The side walls 76 may include or be in the form of a plurality of flexible fingers 80 mounted within the cushion 86, as shown in FIG. 5.

The exterior side door 28 is configured to overlay the container side door 38. The exterior side door 28 and underlying door 38 are preferably located on the left side surface 20 of a passenger seat so that the side door portion 66 is facing the driver of the automobile, assuming a left side driver's seat position. Of course, should the headrest safe be mounted to a driver's seat, the exterior side door 28 and underlying container side door 38 should be positioned on the right side surface 22 facing the passenger positioned on the passenger seat. The exterior side door 28 moves independently of the container side door 38 between a closed or locked position and an open position. The exterior side door 28 may be maintained in a closed position through any conventionally know latch or catch, such as hook and loop type fasteners, magnetic fasteners, mating snaps, press fitting of the exterior side door 28 into the surrounding headrest 12, straps, or the like.

The headrest safe 10 may be coupled to the automobile seat through any conventionally known mounting means, and preferably couples to the seat through the same means as the original manufactured car seat headrest. For example, the headrest 10 may be coupled to the seat through a single mounting post, double mounting posts, or the like. The mounting means should be robust enough to prevent the theft of the headrest safe by its forcible removal from the seat.

In use, the headrest safe 10 is coupled to the seat S of an automobile in the same position as the originally manufacturer's headrest. As the headrest safe is primarily configured to be accessible to the automobile driver, the headrest safe 10 is shown mounted to the passenger seat of the automobile of a left side driver position automobile. As such, the headrest exterior side door 28 and underlying container side door 38 are on the left side of the headrest facing the driver, although the opposite configuration may be made should the headrest safe 10 be mounted to the driver's seat for use and access by a passenger, again assuming a left drive automobile.

A person may place a pistol or gun G within the headrest safe 10 by opening the exterior side door 28 and container side door 38 through the unlocking activation of the lock 56, by placing a recognized, preprogrammed finger upon the fingerprint reader 58. The authorization or recognition of the fingerprint upon the fingerprint reader 58 activates the lock 56 so that the latch 60 releases the catch 62, which allows the biasing force of the spring 40 to move the side door 38 from its closed position to its open position. The sliding tray 70 may be moved to its extended position, shown in FIG. 4, so that the gun is placed upon the tray 70 and within the gun channel 78. The tray 70 is then slid back to its stowed position. The side door 38 may then be moved to the closed or locked position to secure the gun G within the headrest safe 10. The exterior side door 28 is then moved to its closed position.

The side walls 76 may be constructed to have internally mounted flexible, inwardly biasing members 77 which provide a spring biasing aspect to the side walls 76 in a direction towards each other to provide a releasable cradling or holding of the gun G mounted therebetween.

Should it be necessary to quickly access the gun G contained within the headrest safe 10, the driver need only reach over, open the exterior side door 28 and place a finger upon the fingerprint reader 58 of the container side door 38. The reading of the driver's fingerprint activates the lock 56, which releases the catch 62 from the lock latch 60 causing the automatic opening of the side door 38 through the biasing force of the spring 40. With the container side door 38 now open, the driver may reach into the container 34 through opening 37 and pull out the tray 70 by pulling upon the finger flange 74, thereby exposing the gun G. The upright positioning of the gun G through the fit of the side walls 76 and gun channel 78 provides immediate access to the gun G in a natural position wherein a person's finger may be placed immediately adjacent the gun's trigger.

It should also be noted that the positioning of the exterior side door 28 and container side door 38 on the side of the headrest allows for direct access by the person in the oppositely disposed seat. This is a distinct advantage over the prior art wherein the door was positioned on the rear of the headrest, facing the back of the automobile. Such a rearward facing door does not allow for quick access to the interior of the headrest container and the gun therein.

Lastly, it should also be noted that the spring loading of the side door 38 is an option, but provides for a quick and reliable opening of the side door with minimal effort. Again, this allows for the quick access of the interior of the headrest container and the gun therein.

Figure 7:
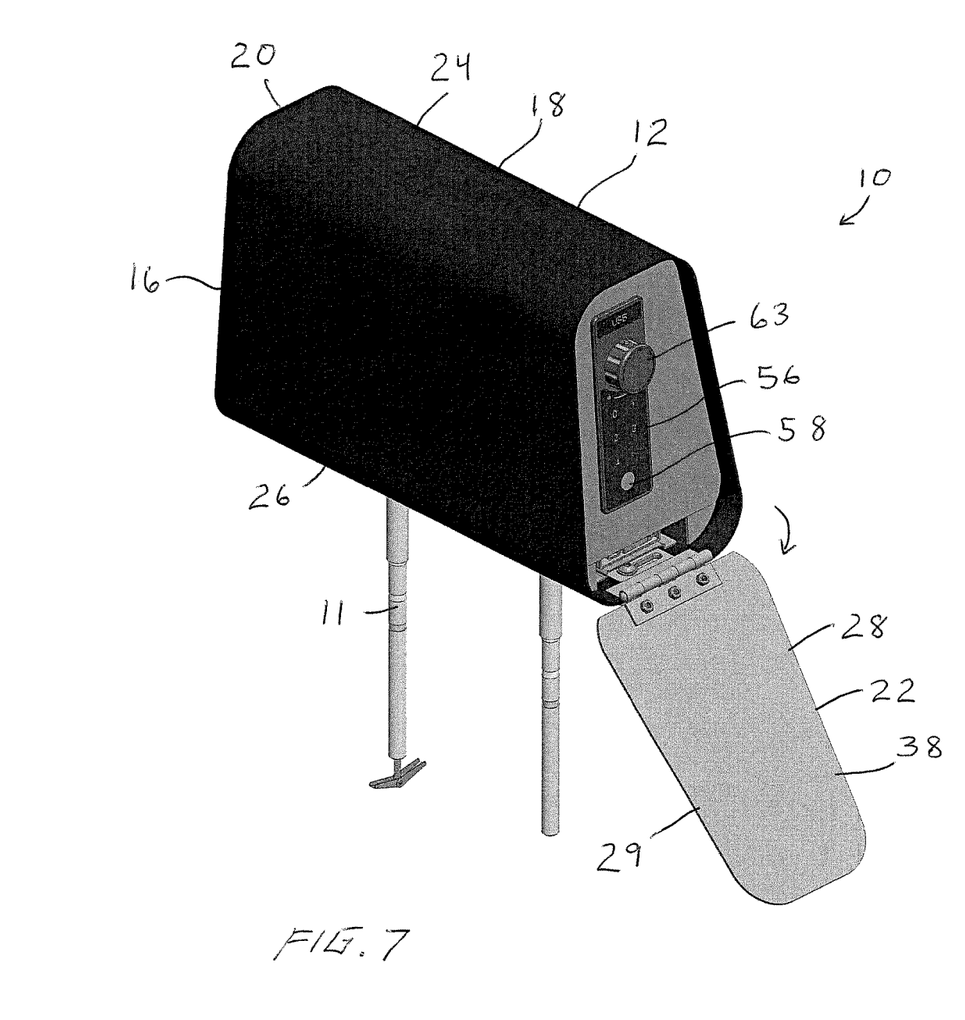
FIGS. 7-9 are a sequence of perspective views of a vehicle headrest safe embodying principles of the invention in another preferred form showing the opening of the vehicle headrest safe with a gun positioned therein.
Figure 8:
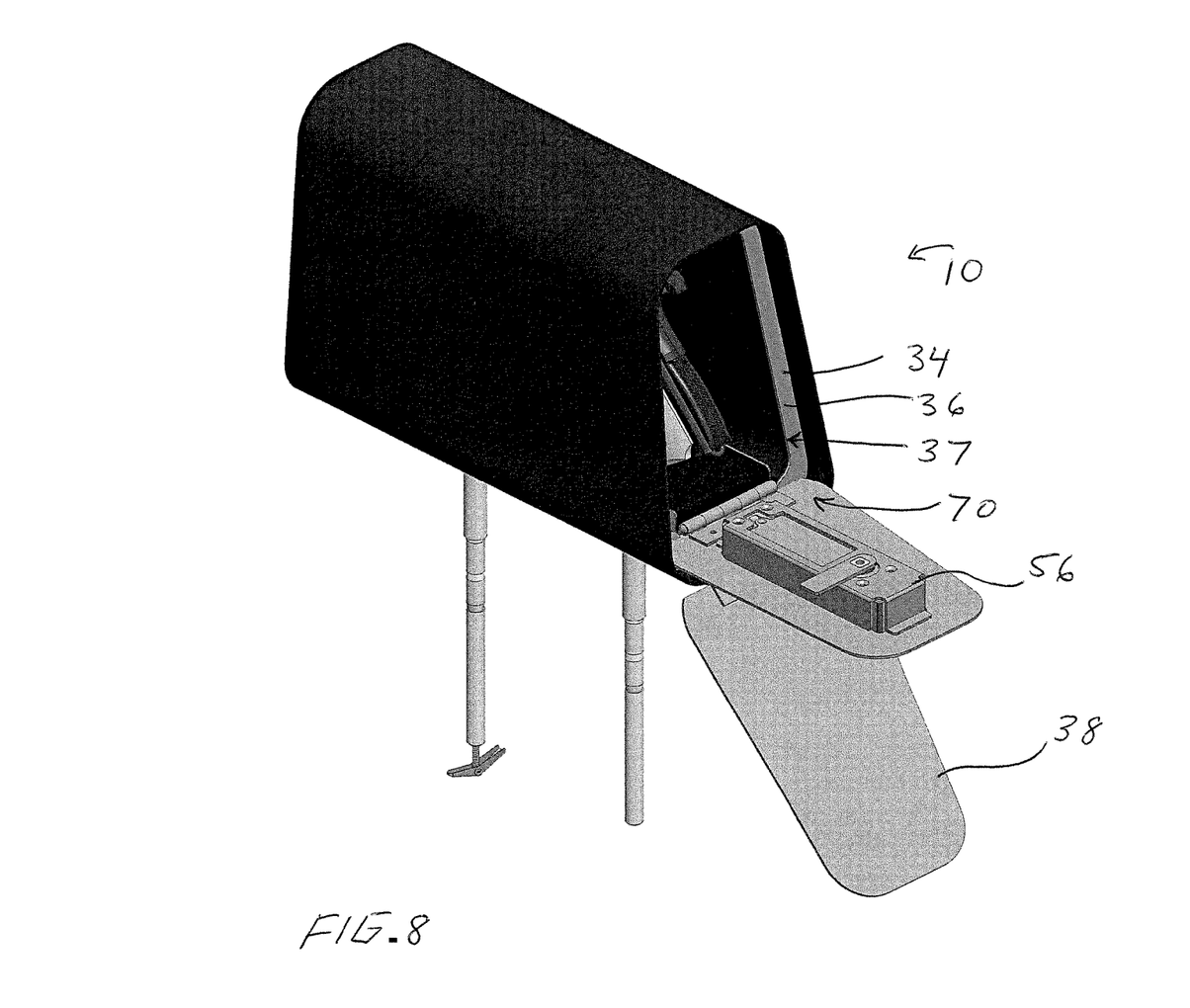
Figure 9:
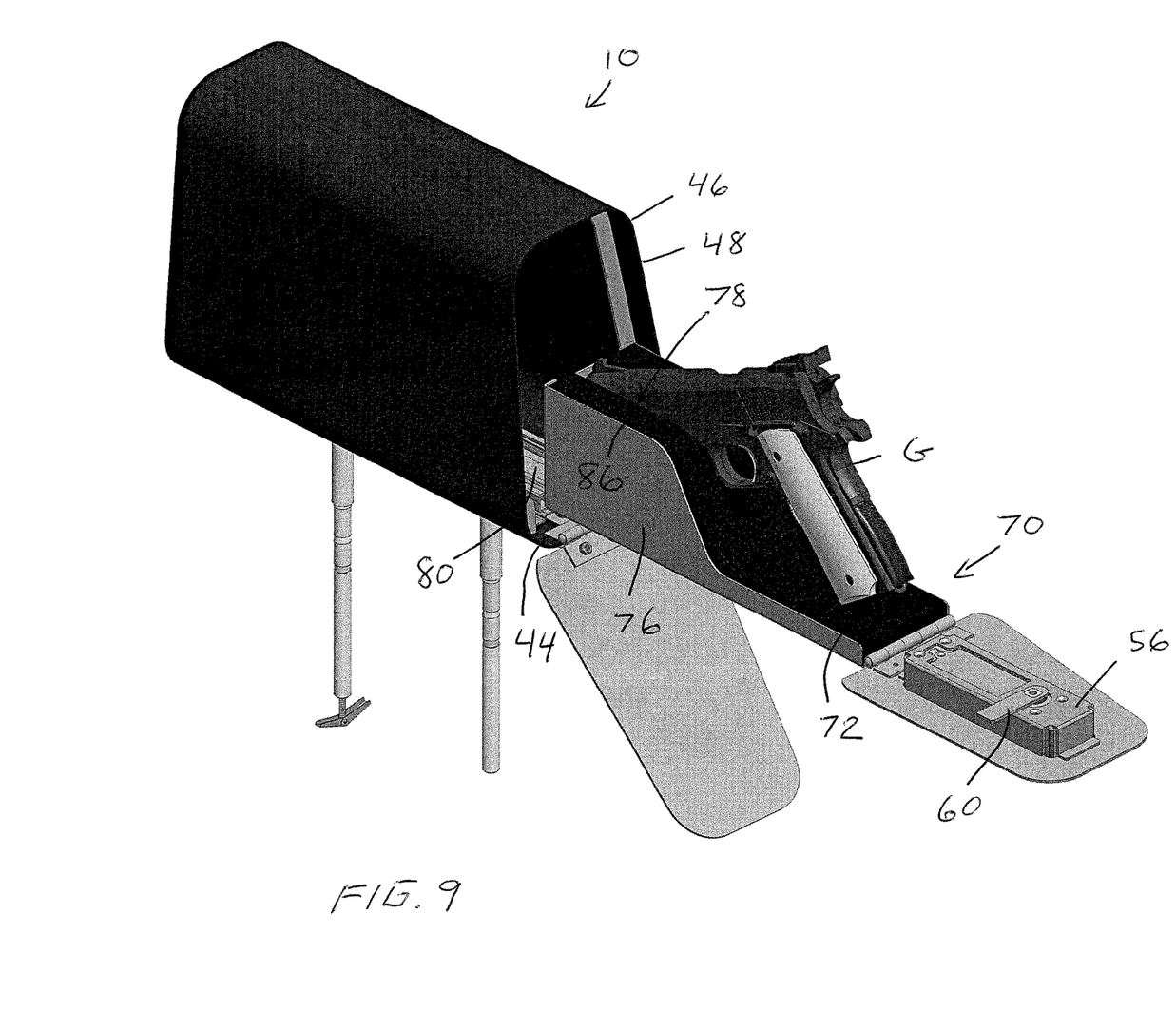

With reference next to FIGS. 7-9, there is a shown an automobile headrest safe 10 in a preferred form of the present invention, although it may be coupled to any type of vehicle's seat and is not limited to automobile seats. The headrest safe 10 is used in conjunction with the seat S, and preferably is aesthetically designed to be substituted for the standard seat headrest of the automobile to provide a uniform appearance to the automobile's interior. The headrest safe 10 is coupled to the standard seat through a link or member 11 which is configured similarly to the standard mounting member of the standard headrest.

The headrest safe 10 includes an exterior housing 12 which is made of a soft material and is shaped to conform to or resemble the standard, stock headrest of that particular automobile. The exterior housing 12 includes a front surface 16 which faces forward with respect to the automobile, a rear surface 18 facing rearwardly, a left side surface 20, a right side surface 22, a top surface 24 and a bottom surface 26. The left and right side surfaces 20 and 22 face laterally with respect to the automobile so that one side surface faces either the driver when mounted to the passenger seat or faces the passenger when mounted to the driver's seat. The exterior housing 12 has a pivotal exterior side door, door portion, or cover 28 and may include a soft cushion or filler material 30 underlying an outer covering 29.

A hollow metal interior enclosure, housing, box, or container 34 is positioned within the interior of the exterior housing 12. The container 34 includes a tubular main or body portion 36 having an open end or opening 37 and a pivotal, reciprocating side door 38. The main portion 36 has a bottom wall 44, top wall 46, two side walls 48, and an unshown end wall oppositely disposed from the container side door 38.

The pivotal side door 38 includes a lock or locking device 56 which prevents the unauthorized opening of the side door 38. The lock 56 is preferably a biometric lock having a fingerprint reader 58. The lock 56 includes a latch 60 which engages a catch mounted to the container 34. The lock 56 maintains the side door 38 in its closed or locked position. The lock 56 may also include an optional key or cylinder lock 63 which may override the biometric lock for select access.

A reciprocating gun slide, holder, or tray 70 is mounted within the interior of the container 34 for reciprocal movement between a retracted or stowed position, shown in FIG. 8, and an extended position, shown in FIG. 9. The tray 70 includes a floor 72 and two sidewalls 76 forming a gun channel 78 therebetween. The tray 70 is sized and shaped to house a pistol or gun G upon the tray 70 and within the gun channel 78. The gun tray 70 includes a two piece sliding rail system 80 to allow reciprocal sliding movement of the tray 70. A resilient cushion or compressible layer 86 may be mounted to the inboard or interior surface of the side walls 76 to provide a soft yet snug cradling or holding of the gun G within the gun channel 78, to prevent unwanted movement of the gun G when stowed, but maintain the upright positioning of the gun G for easy extraction from the tray 70.

The outboard end of the gun tray 70 is coupled directly to the container side door 38 through a hinge 90. The hinge 90 allows the container side door 38 generally to be longitudinally aligned with the gun tray 70 when the container side door 38 is in a fully opened position. This positioning allows the gun tray to be manually pulled from the retracted position to the extended position through the manual pulling of the container side door 38. As such, the gun tray 70 moves laterally along with the lateral movement of the container side door 38.

The exterior side door 28 is configured to overlay the container side door 38. The exterior side door 28 and underlying door 38 are preferably located on the left side surface 20 of a passenger seat so that the side door portion 66 is facing the driver of the automobile, assuming a left side driver's seat position. Of course, should the headrest safe be mounted to a driver's seat, the exterior side door 28 and underlying container side door 38 should be positioned on the right side surface 22 facing the passenger positioned on the passenger seat. The exterior side door 28 moves independently of the container side door 38 between a closed or locked position and an open position. The exterior side door 28 may be maintained in a closed position through any conventionally know latch or catch, such as hook and loop type fasteners, magnetic fasteners, mating snaps, press fitting of the exterior side door 28 into the surrounding headrest 12, straps, or the like.

The headrest safe 10 may be coupled to the automobile seat through any conventionally known mounting means, and preferably couples to the seat through the same means as the original manufactured car seat headrest. For example, the headrest 10 may be coupled to the seat through a single mounting post, double mounting posts, or the like. The mounting means should be robust enough to prevent the theft of the headrest safe by its forcible removal from the seat.

In use, the headrest safe 10 is coupled to the seat S of an automobile in the same position as the originally manufacturer's headrest. As the headrest safe is primarily configured to be accessible to the automobile driver, the headrest safe 10 is shown mounted to the passenger seat of the automobile of a left side driver position automobile. As such, the headrest exterior side door 28 and underlying container side door 38 are on the left side of the headrest facing the driver, although the opposite configuration may be made should the headrest safe 10 be mounted to the driver's seat for use and access by a passenger, again assuming a left drive automobile.

A person may place a pistol or gun G within the headrest safe 10 by opening the exterior side door 28 and container side door 38 through the unlocking activation of the lock 56, by placing a recognized, preprogrammed finger upon the fingerprint reader 58 or actuating the manual locking mechanism. The authorization or recognition of the fingerprint upon the fingerprint reader 58 activates the lock 56 so that the latch 60 releases the catch 62 so as to move the side door 38 from its closed position to its open position. The sliding tray 70 may be moved to its extended position, shown in FIG. 9, so that the gun is placed upon the tray 70 and within the gun channel 78. The tray 70 is then slid back to its stowed position. The side door 38 may then be pivoted to the closed or locked position to secure the gun G within the headrest safe 10. The exterior side door 28 is then moved to its closed position.

The side walls 76 may be constructed to have internally mounted flexible, inwardly biasing members 77 which provide a spring biasing aspect to the side walls 76 in a direction towards each other to provide a releasable cradling or holding of the gun G mounted therebetween.

Should it be necessary to quickly access the gun G contained within the headrest safe 10, the driver need only reach over, open the exterior side door 28 and place a finger upon the fingerprint reader 58 of the container side door 38. The reading of the driver's fingerprint activates the lock 56, which releases the catch 62 from the lock latch 60 causing the opening of the side door 38. With the container side door 38 now open, the driver may grasp the opened side door 38 and pull the gen tray 70 outwardly to its extended position, thereby exposing the gun G. The upright positioning of the gun G through the fit of the side walls 76 and gun channel 78 provides immediate access to the gun G in a natural position wherein a person's finger may be placed immediately adjacent the gun's trigger.

It should also be noted that the positioning of the exterior side door 28 and container side door 38 on the side of the headrest allows for direct access by the person in the oppositely disposed seat. This is a distinct advantage over the prior art wherein the door was positioned on the rear of the headrest, facing the back of the automobile. Such a rearward facing door does not allow for quick access to the interior of the headrest container and the gun therein.

It should also be noted that a spring loading of the side door 38 is an option, as previously described. Again, this may allow for the quick access of the interior of the headrest container and the gun therein.

Variations of the headrest safe fall within the spirit of the claims, below. It will be appreciated that the inventions are susceptible to modification, variation, and change without departing from the spirit thereof.

The invention claimed is:

1. A safe adapted to be mounted to a vehicle seat, the safe comprising,
    an exterior housing contoured to resemble a car headrest, the exterior housing having a front surface oriented relative to the front surface of the vehicle seat, a rear surface oppositely disposed from said front surface, two oppositely disposed side surfaces extending between said front surface and said rear surface, a top surface extending between said front surface and said rear surface, and a bottom surface extending between said front surface and said rear surface, one said side surface having a pivotal door portion for reciprocal movement between a closed position and an open position;
    a container mounted within said exterior housing, said container having a main portion with an end opening and a container door pivotally mounted for reciprocal pivot movement in a first direction between a locked position covering said end opening and an unlocked position uncovering said end opening;
    a lock coupled to said container door to prevent the opening of said container door when in a locked position and to allow the opening of said container door when in an unlocked position, and
    a movable gun tray directly coupled to said container door for reciprocal lateral movement between a retracted position confined within said container and an extended position at least partially extending outward from said container, the container door moving laterally in a linear, second direction forcing the reciprocal, lateral movement of said movable gun tray.

2. The safe of claim 1 wherein said gun tray includes a floor and sidewalls extending from said floor spaced apart from each other to define a gun holding space between said sidewalls.

3. The safe of claim 2 wherein said sidewalls are spring biased towards each other.

4. The safe of claim 2 wherein each said sidewall includes a compressible layer facing said other sidewall.

5. The safe of claim 1 wherein said gun tray includes a hinge, wherein said hinge is also coupled to said container door.

6. The safe of claim 2 wherein said gun tray includes a slide rail system coupling said movable gun tray to said container.

7. The safe of claim 1 further comprising a mounting member extending from said exterior housing for coupling said safe to the vehicle seat.

8. The safe of claim 1 wherein said container door is longitudinally aligned with said gun tray when said container door is in a fully unlocked position.

9. A gun safe adapted to be mounted to a vehicle seat, the gun safe comprising,
    a housing having peripheral walls, one said peripheral wall being a pivotal door;
    a gun tray positioned within said housing for movement between a retracted position confined within said housing and an extended position at least partially extending from said housing, said gun tray being directly coupled to said pivotal door so that the gun tray may be selectively moved in a linear direction between the retracted position and the extended position through linear movement of said pivotal door, and
    a lock coupled to said housing pivotal door to prevent the opening of said housing pivotal door when in a locked position.

10. The gun safe of claim 9 wherein said housing includes an exterior housing and an interior housing mounted within said exterior housing.

11. The gun safe of claim 10 wherein said pivotal door is mounted to said gun tray, and wherein said gun safe further comprises an exterior door pivotally mounted to said exterior housing.

12. The safe of claim 9 wherein said gun tray includes a floor and sidewalls extending from said floor spaced apart from each other to define a gun holding space between said sidewalls.

13. The safe of claim 12 wherein said sidewalls are spring biased towards each other.

14. The safe of claim 12 wherein each said sidewall includes a compressible layer facing said other sidewall.

15. The safe of claim 9 further comprising a mounting member extending from said housing for coupling said safe to the vehicle seat.

16. The safe of claim 9 wherein said pivotal door is longitudinally aligned with said gun tray when said pivotal door is in a fully unlocked position.

17. A vehicle seat safe comprising,
    a seat having a backrest portion and a seating portion forward of said backrest portion, the backrest portion including a headrest, said headrest including a headrest door;
    an interior housing mounted within said headrest, said interior housing having a tubular body portion having an opening therein and an interior housing door to close said opening, said headrest door overlying said interior housing door,
    a reciprocating gun holder mounted within said interior housing for reciprocal movement between a retracted position confined within said interior housing and an extended position at least partially extending from said interior housing, said interior housing door being pivotally coupled directly to said reciprocating gun holder so that linear movement of said interior housing door linearly and forcibly moves said reciprocating gun holder, and a lock coupled to said interior housing door to prevent the opening of said interior housing door when in a locked position and allowing the opening of said interior housing door when in an unlocked position.

18. The safe of claim 17 wherein said interior housing door is longitudinally aligned with said gun holder when said interior housing door is in a fully unlocked position.

19. The safe of claim 18 wherein said gun holder includes a slide rail system coupling said movable gun holder to said interior housing.

* * * * *